(12) United States Patent
Zhou (10) Patent No.: US 7,954,975 B2
(45) Date of Patent: Jun. 7, 2011

(54) REFRACTION-TYPE LED CEILING LAMP

(75) Inventor: Jian-Lin Zhou, Dong-guan (CN)

(73) Assignee: MIG Technology Inc., Dong-guan, Guang-Dong Province (CN)

( * ) Notice: Subject to any disclaimer, the term of this patent is extended or adjusted under 35 U.S.C. 154(b) by 245 days.

(21) Appl. No.: 12/418,350

(22) Filed: Apr. 3, 2009

(65) Prior Publication Data

US 2010/0254121 A1   Oct. 7, 2010

(51) Int. Cl.
*F21S 8/00*   (2006.01)
(52) U.S. Cl. ........ 362/147; 362/148; 362/294; 362/364; 362/612; 362/625
(58) Field of Classification Search .......... 362/147, 362/148, 294, 364, 602, 604, 605, 606, 612, 362/613, 623, 625
See application file for complete search history.

(56) References Cited

U.S. PATENT DOCUMENTS

| | | | |
|---|---|---|---|
| 6,296,372 B1 * | 10/2001 | Rhomberg | 362/225 |
| 6,355,961 B1 | 3/2002 | Forbes | |
| 6,540,373 B2 | 4/2003 | Bailey | |
| 7,311,423 B2 | 12/2007 | Frecska et al. | |
| 7,547,112 B2 * | 6/2009 | Kim | 362/148 |
| 2001/0046131 A1 | 11/2001 | Hoelen et al. | |

* cited by examiner

*Primary Examiner* — Stephen F Husar
(74) *Attorney, Agent, or Firm* — Muncy, Geissler, Olds & Lowe, PLLC (57) ABSTRACT

A refraction-type LED ceiling lamp, especially a plate-type ceiling lamp which is used on an indoor ceiling, includes primarily a fiber light guide plate, a reflection surface of which is provided with multiple chip-shape reflection elements, distributed in arrays. A chip size of the reflection elements decreases gradually toward an entrance surface by a geometric series; whereas, a gap between the reflection elements increases gradually. A reflection curve of the reflection element allows light to be projected out uniformly and a required illumination angle to be achieved.

10 Claims, 14 Drawing Sheets

REFRACTION-TYPE LED CEILING LAMP

BACKGROUND OF THE INVENTION a) Field of the Invention

The present invention relates to a refraction-type LED (Light Emitting Diode) ceiling lamp, and more particularly to a plate-type ceiling lamp which is used on an indoor ceiling with a limited projection angle to project brilliance on a limited area on a ground, forming uniform light beams of emission and effectively defining a projection area. In addition, the ceiling lamp can be assembled on the ceiling successfully and can be cooled spontaneously.

b) Description of the Prior Art

In a wave of saving energy and reducing carbon dioxide emission, energy-saving illumination equipment has become a mainstream in household or office illumination. A fluorescent light and an LED lamp can save energy, yet as an existing LED lamp is deployed as a dot-matrix distribution, the LED lamp is a point source of light in the dot-shape distribution if viewing from outside. In addition, due to an error in a manufacturing process or of a material, each LED lamp will have a different illumination efficiency and wavelength, and a color render index of the LED lamp will be inferior. Whereas, a conventional fluorescent light is provided with uniform brightness, and the color render index and intensity of illumination are uniform and soft by a new three-wavelength technology. Therefore, for an implementation using the LED as an illumination element, light beams should be transformed through an optical mechanism so as to be applied to indoor illumination.

In general, a quantity of illumination devices is determined by a floor space size in a room. For example, an office of about 6-8 m² (meter) will require 100 W (watt) of illumination equipment for reading and an illumination angle should be less than 180° in principle, whereas the illumination angle is set at 180° for the illumination equipment that is provided with a directionality function so as to define a specific illumination angle for an illumination area. Although utilization of light energy can be satisfied through defining the illumination angle to prevent from unnecessary loading to the light energy, it is difficult to define the illumination angle for an ordinary lamp-set.

An LED illumination business has been recognized as one of the promising businesses in recent years, mainly due to a small size and light weight. If the LED can be applied to illumination, a household space will be provided with a more flexible utilization mode and an effect of energy-saving can be expected. The LED is small in size and has a fast response time, and does not have a danger of mercury in the conventional fluorescent light; these are all the advantages of the LED. However, the LED that is applied in the household illumination should operate at a high power; hence, waste heat will be generated correspondingly. In addition, a working temperature of an LED lamp-set system cannot be too high and a total temperature difference should not be higher than 15° to prevent from thermal strain degradation of material by heat or prevent the material from undergoing a vicious cycle by a resistance factor that the efficiency is lost. If the lost of efficiency exceeds 10%, then the brilliance of projection will decrease explicitly, which largely reduces a total lumen of light flux at the projection area.

An existing LED illumination design includes U.S. Pat. No. 6,540,373 B2 disclosing a slab on which multiple LED excitation units are arranged in a matrix. The slab is one of the plates forming a ceiling and therefore, light can be emitted downward. However, as the excitation unit is a point source of light, appearance will offend eyes and lumen or a color temperature will be non-uniform due to the manufacturing error.

In U.S. Pat. No. 6,355,961 B1, a projection surface of the LEDs, arranged in a matrix, is provided with a photo-rectifier to dissipate light spots, and in another U.S. Pat. No. 7,311,423 B2, a location where a conventional fluorescent light resides is replaced with an LED, having a same issue of an explicit point source of light.

In terms of a light beam modulation technology, there is US Publication No. 2001/0046131 A1 wherein a mixing chamber is utilized to reflect a light beam operation part, with the light beam being pre-expanded through a diffuser assembly and then entering into a light guide plate. In addition, a direction of the light beam is changed at a reflection surface to serve as backlit for an LED board. This invention is utilized in a different situation and the methods of pre-mixing and pre-diffusing are employed. Therefore, a light flux has been lost significantly before entering into the light guide plate in spite that when the light beam is used for the LED backlit, the brightness is very uniform. Nevertheless, for the indoor illumination that focuses on the energy saving, the loss from the light beam pre-transformation operation does not facilitate a general implementation.

SUMMARY OF THE INVENTION

With the principles of light reflection and refraction, the present invention utilizes angle guidance and a reflection design which corresponds with an unequal optical path to allow a ceiling lamp to have an effect of uniform intensity of illumination and lumen, to define a projection area and to effectively utilize a light flux.

The present invention utilizes a slab-shape light guide plate, with at least two parallel and opposite entrance surfaces to allow light beams generated from a series of excitation units to enter into the light guide plate oppositely. The light guide plate is formed with a refraction surface to emit the light beam and with another surface which is a reflection surface. The reflection surface is provided with plural reflection elements which are arranged in a matrix. A chip size of the reflection element decreases gradually by a geometric series toward the entrance surface, from a breadth center; whereas a gap between the reflection elements increases gradually by a geometric series. In principle, the chip size of the reflection elements at the breadth center is 2, gradually decreasing to 1 for the chip size of the reflection elements at a periphery of the breadth. On the other hand, the gap between the reflection elements at the center of the reflection breadth is 1, gradually increasing to 2 for the gap between the reflection elements at the periphery of the breadth. To allow the light beams that are emitted from the excitation units to be depleted gradually when the beams reach to the center in progression of the optical path, a density of the reflection elements can be increased at the center to forcefully enhance the reflection operation, enabling the lumen of the light beams emitted from the entire refraction surface to be uniform. The reflection element is in a convex shape and is provided with an inward reflection curve. The reflection element can change a direction of and reflect the light beam emitted by the excitation unit at a fixed angle into a vertical line close to the refraction surface, such that the optical path of the excitation unit is bended by about 90°. Therefore, in terms of the illumination angle, the ceiling lamp can be effectively defined as projecting downward to guide the light flux to illuminate downward in full intensity approximately.

The present invention focuses on an effective utilization of directionality of the total light flux, allowing the light beams to be emitted uniformly for the entire refraction surface and effectively dissipating the waste heat of the excitation units. Accordingly, a fiber light guide plate is designed, wherein at least two parallel entrance surfaces provide a corresponding design of the excitation units arranged in a series, with light energy generated by the excitation units entering from the entrance surfaces at two parallel sides, being reflected and traveling forward in the light guide plate. The light beams that enter into the entrance surfaces are divided into multiple orientations and basically, a size of the light guide plate can be chosen according to the emission angle of the excitation unit. For an ordinary LED excitation unit, the emission angle is between 20° and 60°. After the emitted light beam has entered from the entrance surfaces of the light guide plate, a part will operate on the refraction surface, whereas other part will operate on the reflection surface. After reaching the reflection surface, the light beam is reflected according to a normal of the reflection surface to travel toward the refraction surface. On the other hand, the reflection surface is provided with the reflection elements which are provided with the reflection curves. The reflection curve corresponds to the light beam that enters from the entrance surface and is bended effectively, allowing an emission route refracted from the reflection beam to approach to a vertical line of the refraction surface, thereby transforming the light beam generated by the excitation unit by about 90°. Therefore, the illumination angle of the ceiling lamp can be oriented effectively to define a limited angle, the light flux will not be loaded unnecessarily, and a frame of the excitation unit can be utilized directly as a heat conduction mechanism to effectively dissipate the waste heat generated, with an assembly part being formed by utilizing the frame to facilitate installing on the ceiling to illuminate on a ground. In addition, the uniform brightness can be achieved and the illumination angle can be defined, which are the primary object of the present invention, by arranging the reflection elements on the reflection surface in a matrix, with the gap increasing gradually by a geometric series from the center and the chip size of the reflection elements decreasing gradually from the center.

Another object of the present invention is that the frame, which is provided with a locking function, provides for the serial arrangement of the excitation units and fixes the light guide plate through an assembly method.

A third object of the present invention is that an exterior surface of the reflection surface of the light guide plate is provided with a reflection plate which reflects inward, and the refraction surface can be provided outward more with a light diffuser plate which can be further configured as a brightness enhancing plate (brightness enhancing film).

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
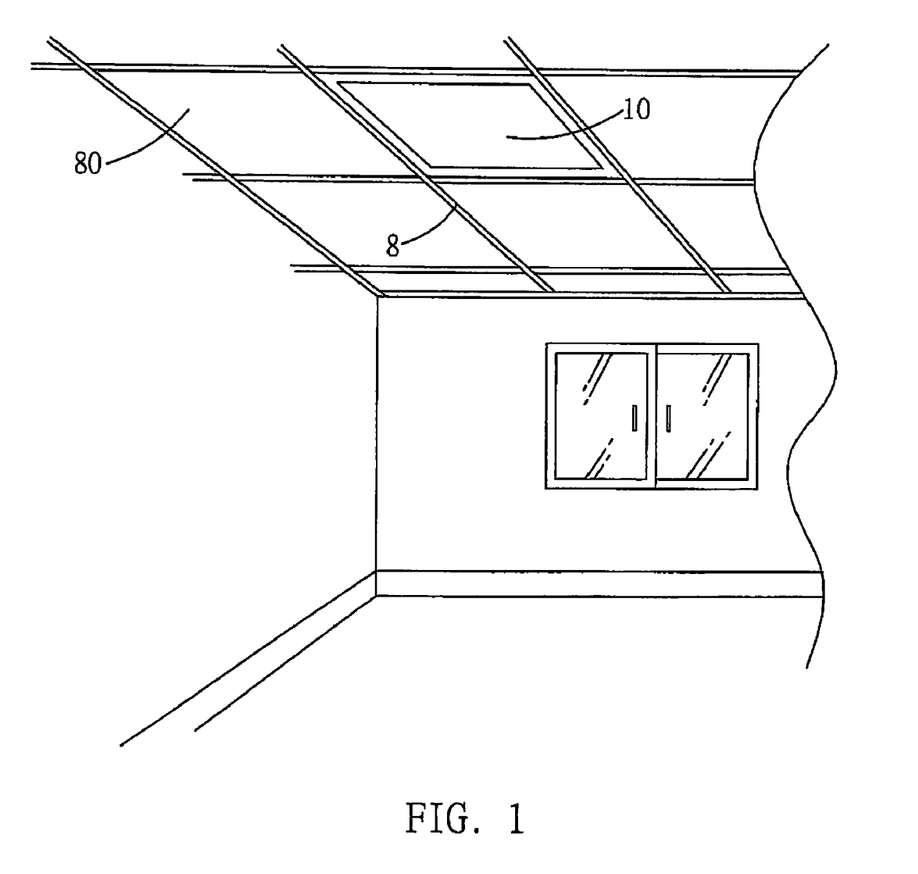
FIG. 1 shows a schematic view of the present invention which is applied to an indoor ceiling.

Referring to FIG. 1, a ceiling lamp 10 of the present invention is applied to an indoor ceiling, e.g. of a configuration with light-weight steel frames 8. The ceiling lamp 10 has a same area as a partition panel 80 and therefore can be easily assembled at the light-weight steel frame 8 to form illumination on a ground.

Figure 2:
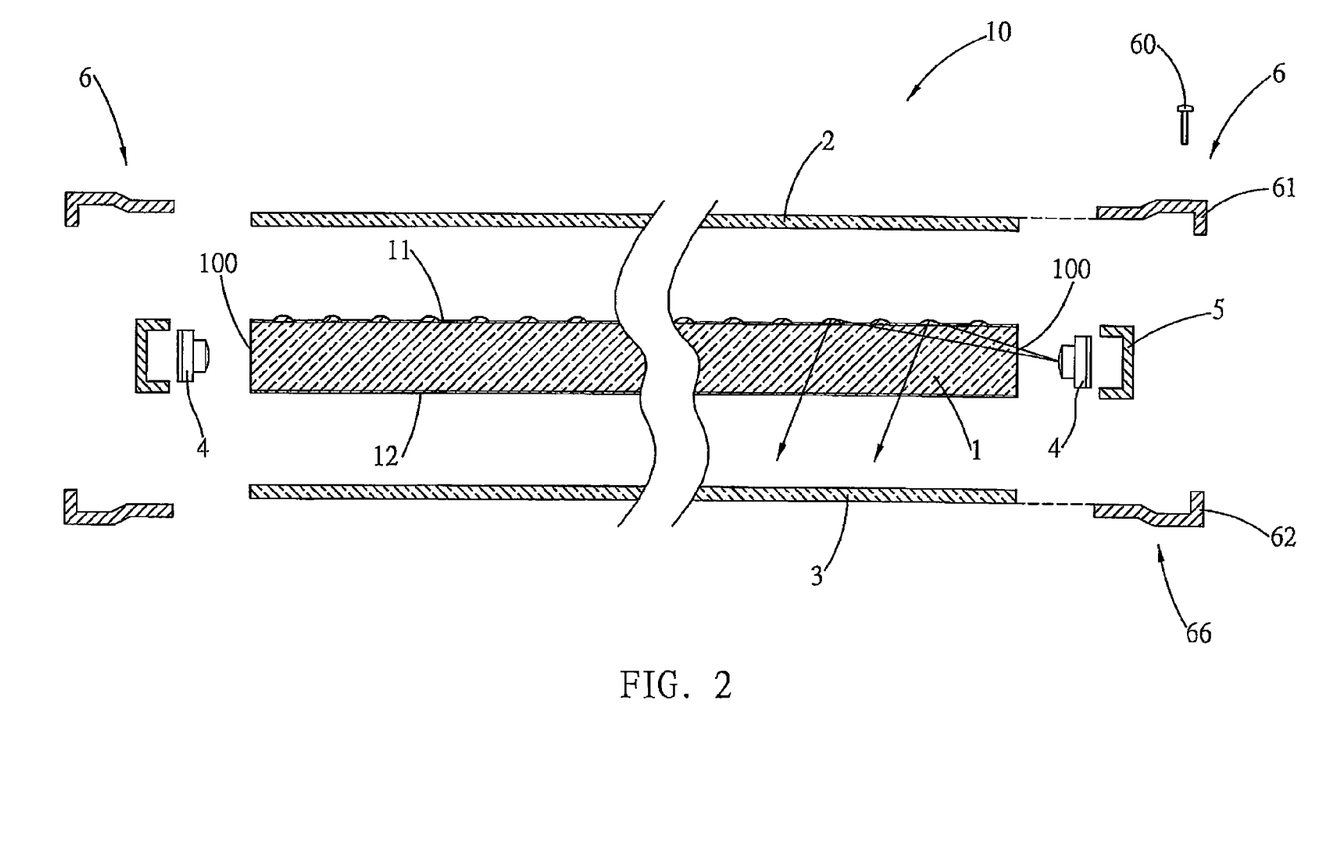
FIG. 2 shows a side cutaway view of structures of the present invention.

Referring to FIG. 2, the ceiling lamp 10 of the present invention comprises primarily a light guide plate 1, wherein two opposite sides are parallel to each other and are formed respectively with an entrance surface 100, an exterior part of the entrance surface 100 is provided correspondingly with an LED excitation unit 4 which forms a series, and an exterior part of which is a heat conduction unit 5 to expel waste heat, forming a waste heat dissipating path. Lower and upper sides of the light guide plate 1 are formed respectively with a refraction surface 12 and a reflection surface 11. A light beam generated by the excitation unit 4 enters from the entrance surface 100, and then is reflected and travels forward inside a space between the refraction surface 12 and the reflection surface 11.

An exterior of the reflection surface 11 can be provided with a reflection plate 2, and an upper frame 61 and a lower frame 62 of a frame 6 can be used to clamp the heat conduction unit 5, the LED excitation unit 4, the light guide plate 1, a light diffuser plate 3 and the reflection plate 2 which are finally fixed by an assembly element 60. After dismantling the assembly element 60, the upper frame 61, the ceiling lamp 10 and the heat conduction unit 5 can be separated, so as to facilitate repairing the excitation unit 4.

At least one side of the frame 6 is provided with an assembly part 66 for assembling with an exterior part, such as by hanging or crossing-over.

Figure 3:
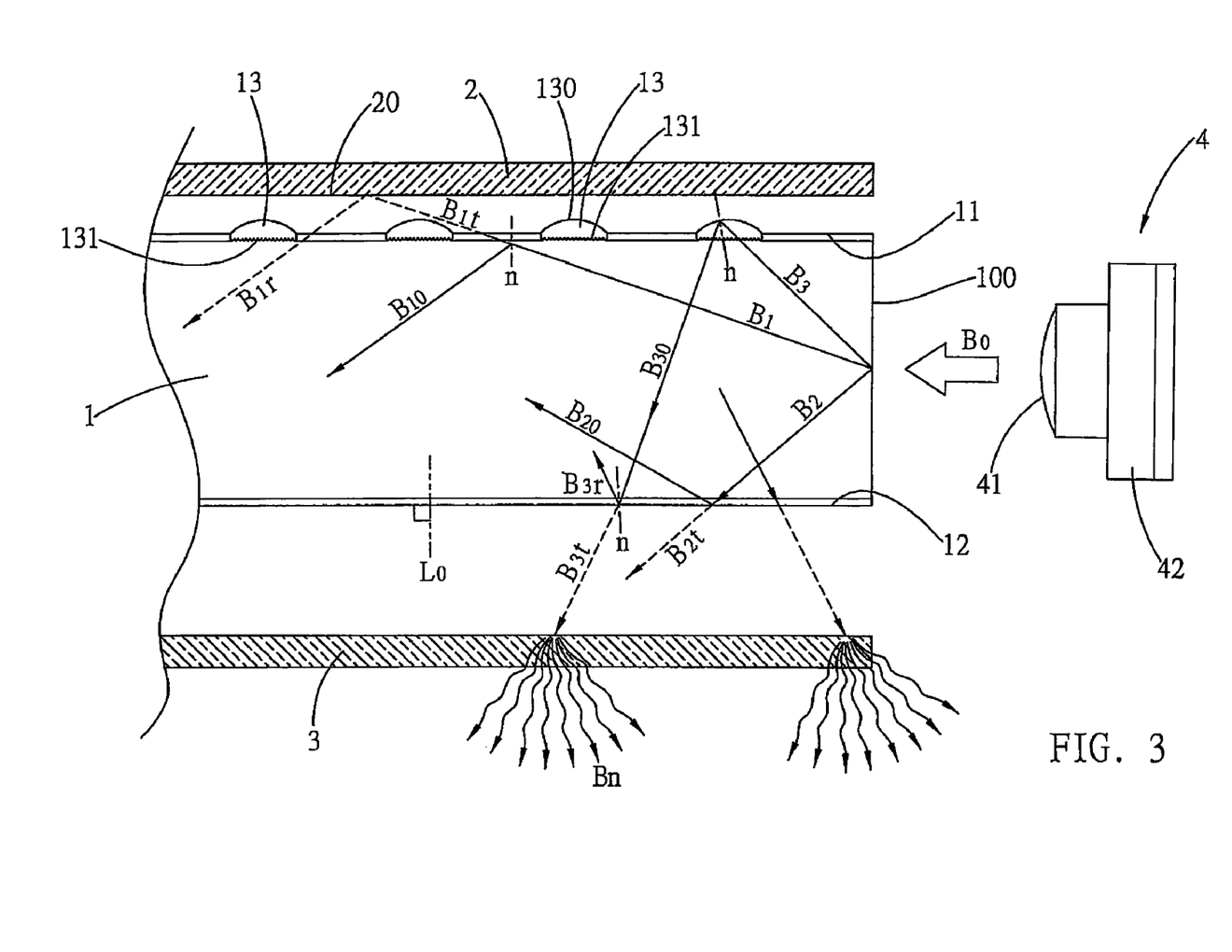
FIG. 3 shows a side view of a working principle of light beam of the present invention.

Referring to FIG. 3, an essential working principle of the light beam of the present invention is that a light beam $B_0$ emitted by the LED excitation unit 4 enters from the entrance surface 100 of the light guide plate 1, followed by traveling forward from being reflected on the reflection surface 11 and part of the beam $B_0$ traveling forward from being reflected inward, between the reflection surface 11 and the refraction surface 12. The light beam $B_0$ is set up by a manufacturing specification of an illumination chip 41 of the excitation unit 4. For example, for an angle of 60°, the light beam emitted will enter from the entrance surface 100 at 60°. In addition, the illumination chip 41 is assembled on a substrate 42, allowing multiple illumination chips 41 to be arranged in a series.

After the light beam $B_0$ generated by the LED excitation unit 4 has entered from the entrance surface 100, a light beam $B_1$ will operate on the reflection surface 11 and a reflection beam $B_{10}$ will be resulted according to a normal n of the reflection surface 11, whereas part of the light beam $B_1$ will result in a refraction beam $B_{1r}$ due to reflection loss of the reflection surface 11. The refraction beam $B_{1r}$ can be reflected again by a reflection surface 20 provided on an interior surface of the reflection plate 2 to reflect a feedback beam $B_{1r'}$ toward the light guide plate 1. Therefore, for the light beam $B_1$ which enters from the light beam $B_0$, there will be the aforementioned reflection beam $B_{10}$ and feedback $B_{1r'}$, or a partial beam $B_2$ which will operate on the refraction surface 12. As the refraction surface 12 can be further provided with a higher refraction rate, small part of the beam will form an internal reflection beam $B_{20}$ as a traveling light; whereas, a light beam which comes out from the light beam $B_2$ through the operation of the refraction surface 12 is a refraction beam $B_{2f}$ which is one of the light beams for illumination.

Figure 4:
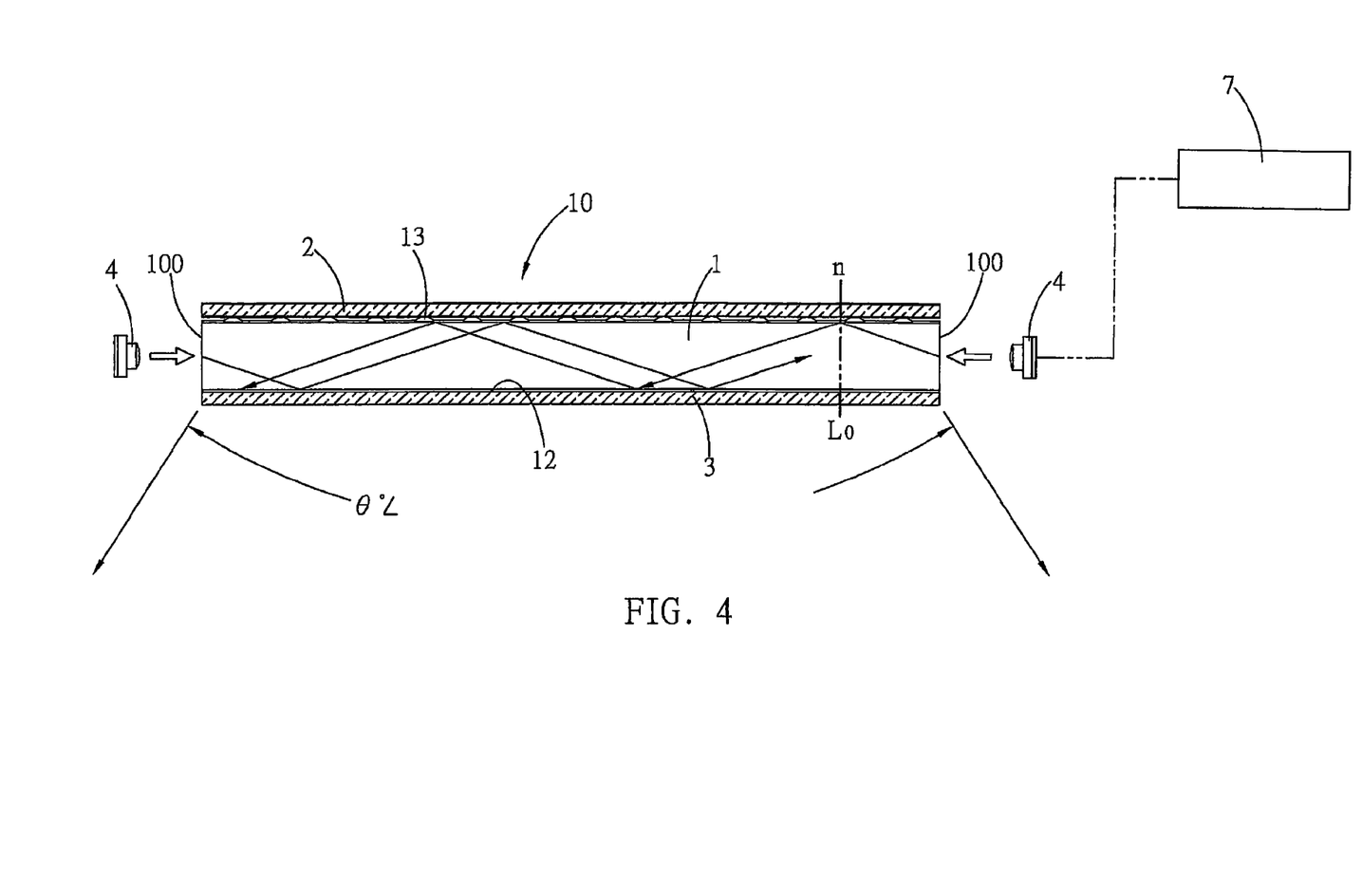
FIG. 4 shows a schematic view of illumination angles of the present invention.

Another light beam $B_3$ which enters from the entrance surface 100 will operate on a reflection element 13 which is provided with an inward reflection curve 130. The reflection curve 130 will form an interior reflection and result in a reflection beam $B_{30}$ according to a normal n of curvature. The reflection beam $B_{30}$ changes a direction significantly to alter a traveling orientation of the light beam $B_0$ which is transmitted from the excitation unit 4, allowing the reflection beam $B_{30}$ to be close to a vertical line $L_0$ of the refraction surface 12, thereby defining an illumination angle θ (as shown in FIG. 4).

By the operation of that reflection beam $B_{30}$, the light beams can be largely concentrated to be close to the vertical line $L_0$ of the refraction surface 12, defining a light flux as downward emission, such that a total light flux can be used effectively without being depleted horizontally.

On the other hand, when the reflection beam $B_{30}$ operates on the refraction surface 12, part will be reflected as a reflection beam $B_{3r}$, and part will form a refraction beam $B_{3f}$ when passing through a different medium. As the refraction beam $B_{3f}$ is formed from a rarefaction-compression process, the beam $B_{3f}$ will deviate from the normal n, but this deviation will not explicitly affect the projection angle.

The refraction beam $B_{3f}$ and the aforementioned refraction beam $B_{2f}$ are all the light beams used for illumination. An exterior surface of the refraction surface 12 of the light guide plate 1 can be provided with the light diffuser plate 3 which further diffuses the refraction beams $B_{3f}$, $B_{2f}$. Accordingly, for illumination beams $B_n$ formed, brightness will be more uniform, and the light diffuser plate 3 can be an optical diffusion material or a brightness enhancing film.

The reflection element 13 is convex and protrudes out of the upper surface of the light guide plate 1. In principle, the light guide plate 1 is an optic fiber to guide light, and the reflection surface 11 and the refraction surface 12 formed are all capable of internal reflection. The reflection element 13, on the other hand, is assembled on the exterior surface of the reflection surface 11 of the light guide plate 1 by ink printing or being formed integrally.

If the reflection element 13 is formed by the optic ink printing method, then an assembly interface 131 will form a pattern to damage structures, allowing the reflection surface 11 within the assembly interface 131 to lose the capability of reflection. Therefore, after the light beam $B_0$ has entered, and before the traveling beam $B_3$ has operated on the reflection curve 130, a scattering effect will be formed and uniformly operate on the entire inner curve of the reflection curve 130 through the assembly interface 131, with the inner curve reflecting out the reflection beam $B_{30}$ directionally. Accordingly, the damage condition of the assembly interface 131 can determine an intensity of the reflection beam $B_{30}$ in a single path, and the reflection beam $B_{30}$ can be pre-diffused to form more reflection of uniform orientation, with the light beam $B_{30}$ being emitted out through the refraction surface 12.

The light diffuser plate 3 is a diffusing device and will carry out secondary diffusion to the light beams that are refracted from the light guide plate 1; hence, the light beams that are projected from the entire projection surface of the light guide plate 1 can have a fine and uniform distribution in appearance.

According to experiments of the present invention, the brightness of illumination and the uniform intensity of illumination can all satisfy or even exceed a bed side fluorescent lamp, including a fluorescent light, a PL lamp or a T5 light tube. The experiment material used in the present invention is a single LED of 1 W, with the total illuminance measured being 13,460 LUX at a center of the surface, 1,100 LUX at a center of 1.2 m of optical path, and 510 LUX at a center of 1.6 m of optical path.

The features that the single LED shows are low power loss, uniform surface brightness and an extremely high efficiency. In addition, the structure is firm and a shape is light-weight and thin, which can be applied indoor, to an office or a special work condition, and can be even used for high brightness advertisement illumination in a public space.

The present invention transforms the light beams, with the effect that the light beams generated by the LED can be deflected directly and diffused uniformly. In addition, as the LEDs used are not too many, energy consumption will be reduced correspondingly. Moreover, according to an ordinary circuit application, the present invention can be set as remote controlling, the brightness can be adjusted, a color wave can be changed or a color temperature can be adjusted. As these kinds of adjustments belong to an ordinary circuit modulation technology, further description is not provided. Basically, by fitting with these adjustments and inherent features, the present invention can be more suitably accepted by vision of human.

Referring to FIG. 4, the ceiling lamp 10 of the present invention employs a power supply 7 to gain electricity. After the LED excitation unit 4 has operated, the light beam generated by the excitation unit 4 will be reflected outward from the refraction surface 12, through the transformation of the light guide plate 1 and the reflection plate 2 or the light diffuser plate 3. In addition, due to the operation of the reflection element 13, the illumination angle of the ceiling lamp 10 can be defined at a certain degree θ, allowing the total light flux to be concentrated in θ and to be projected on the ground. Moreover, when a projection distance is set at 1.6 m or 2.0 m, the intensity of illumination can be better satisfied and compatible with a fluorescent light.

Figure 5:
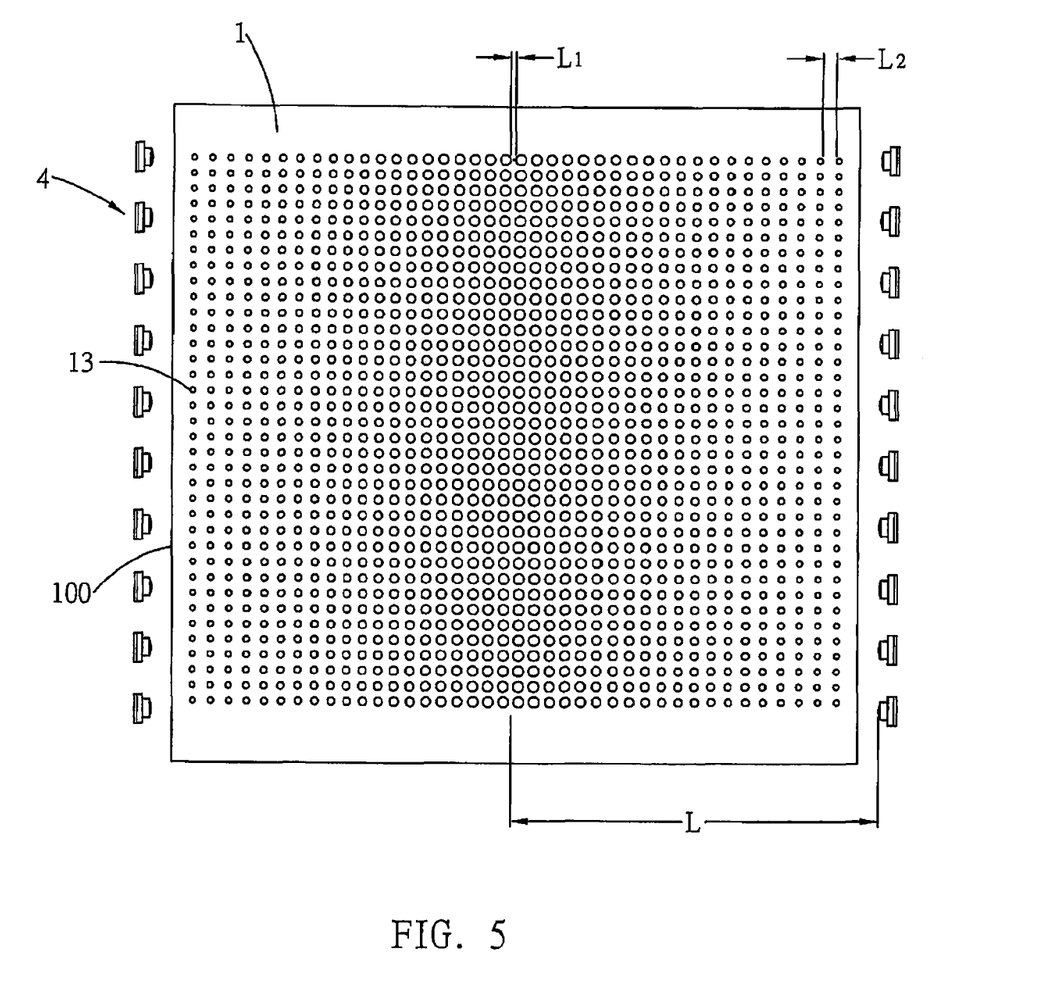
FIG. 5 shows a schematic view of a distribution of reflection elements which are arranged, according to the present invention.

Referring to FIG. 5, the protruded reflection element 13 (as shown in FIG. 3) that is provided on the reflection surface of the light guide plate 1 can be implemented by printing or integrally formed with the light guide plate 1. Basically, the reflection element 13 is a round and convex spherical body, assembled at a side of the reflection surface 11. For the array arrangement of the reflection element 13, in order to allow a breadth center of the light guide plate 1 to have a higher probability of reflection, a concept of shape expanding and a method of distribution in a narrow gap are employed, such that an equal transformation effect can be available in an optical path L which is resulted from the LED excitation unit 4. The configuration of the reflection element 13 is based on the breadth center of the light guide plate 1, where the reflection elements 13 provided in the breadth center are larger, with a chip size decreasing outward gradually by a geometric series, which can further allow the chip size of the reflection elements 13 in the breadth center to be 2 times that the chip size of the reflection elements 13 close to the entrance surface 100.

On the other hand, a distance between neighboring reflection elements 13 is a relative distance on a circumference of each reflection element 13, with a gap of $L_1$ at the breadth center increasing gradually outward by a geometric series, to a relative gap of $L_2$ between the neighboring reflection elements 13 close to a side of the entrance surface 100. In addition, the gap $L_2$ can be set as twice the gap $L_1$. Therefore, in the optical path L, the light beams generated by the excitation unit 4 can be reflected more toward the center, such that weaker energy close to the center of the optical path can be concentrated in quantity and intensity, while the illumination beams emitted from the refraction surface 12 are equal.

Figure 6:
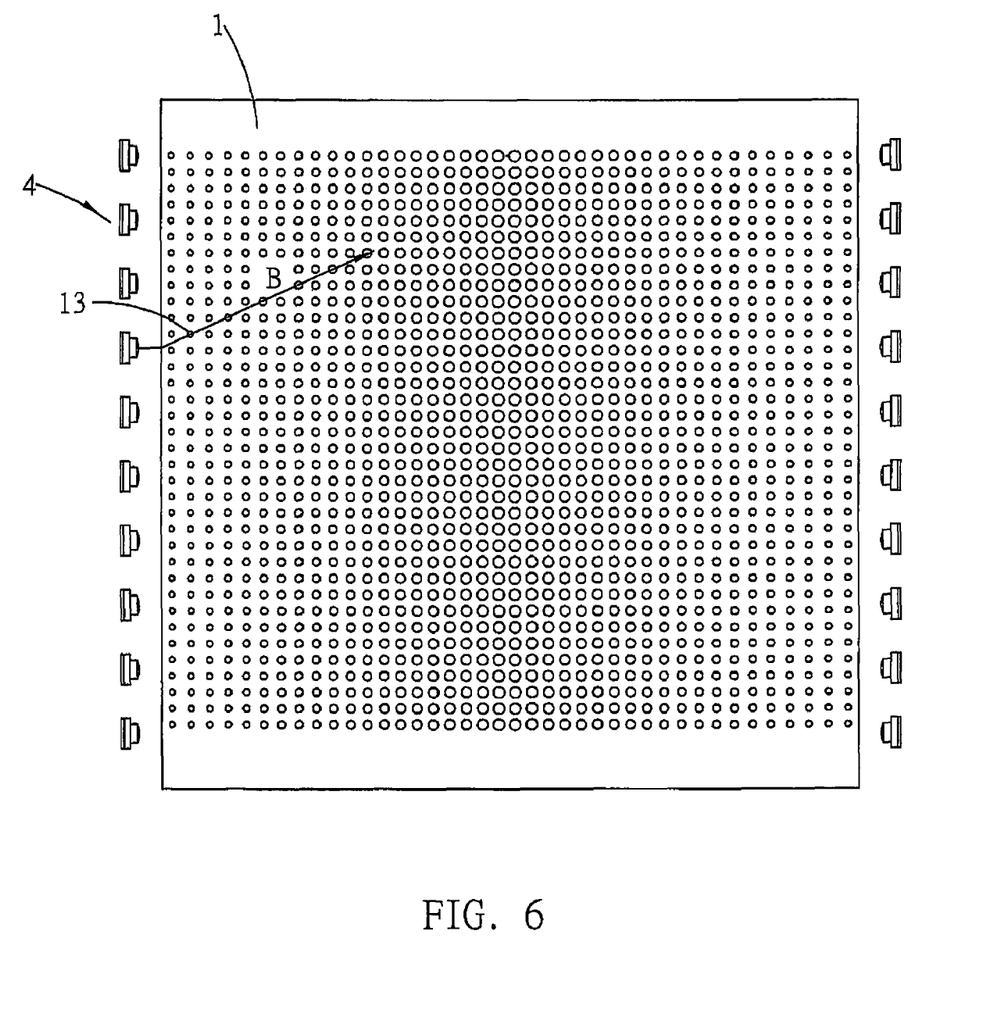
FIG. 6 shows a schematic view of a relative optical path of a reflection element, according to the present invention.

Referring to FIG. 6, for the aforementioned arrangement of the reflection elements 13 on the breadth of the light guide plate 1, it is preferred that a linear position of the reflection element 13 faces exactly toward a path of light beam B emitted by the LED excitation unit 4.

Figure 7:
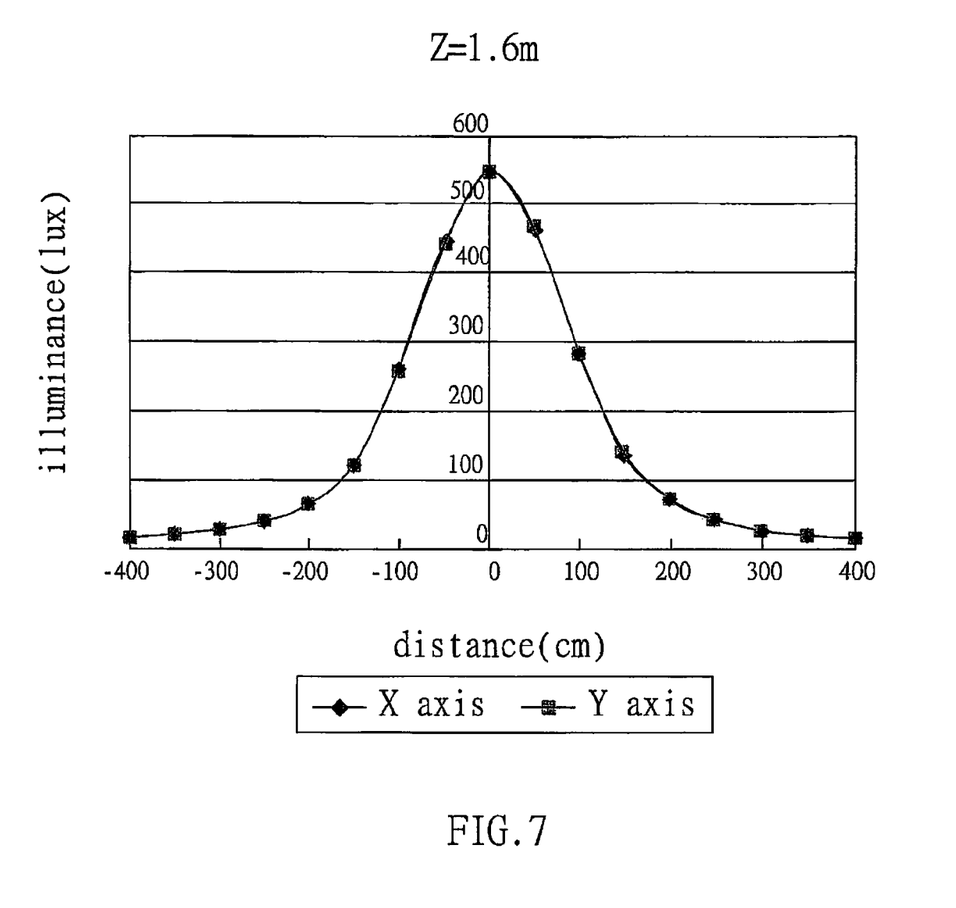
FIG. 7 shows illuminance curves at 1.6 m of an optical path of the present invention.
Figure 8:
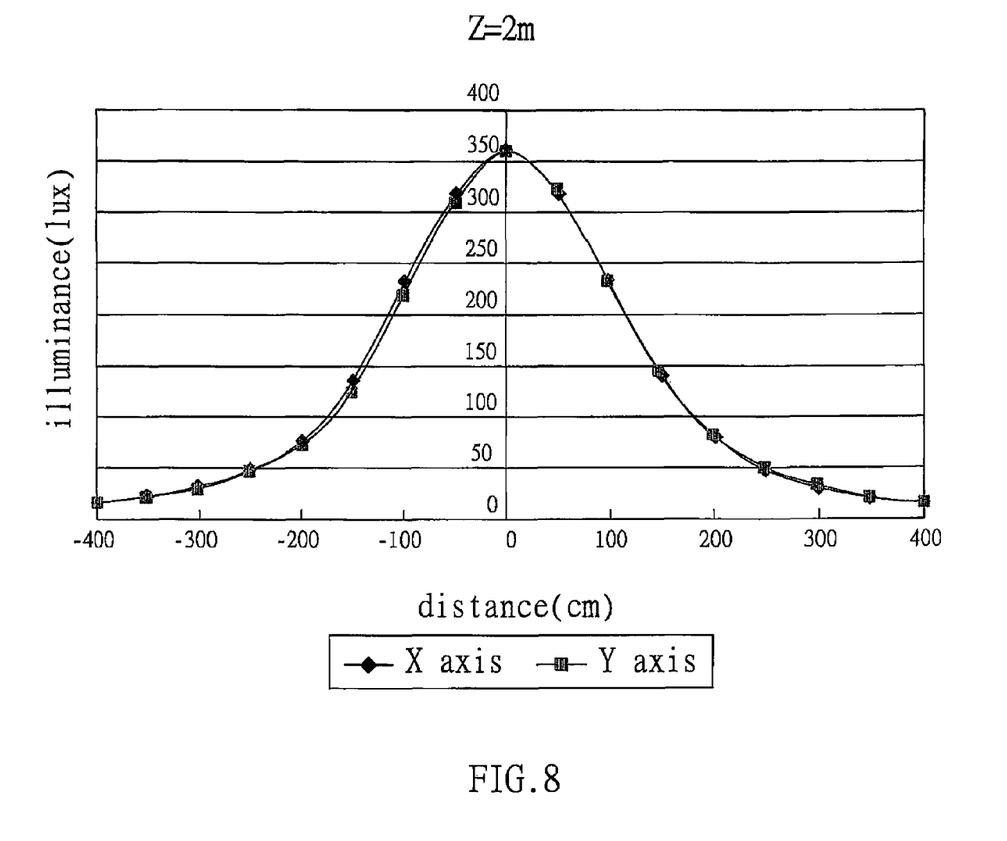
FIG. 8 shows illuminance curves at 2 m of an optical path of the present invention.
Figure 9:
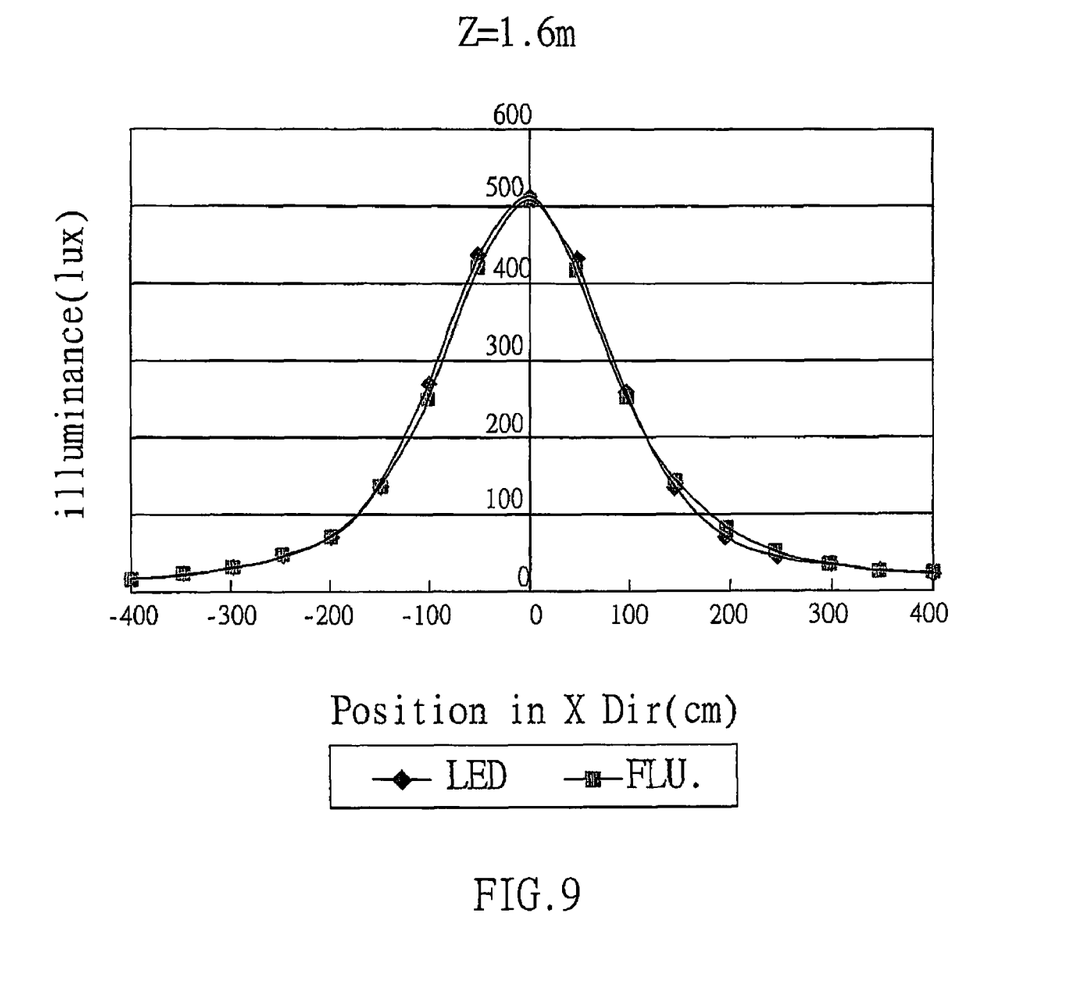
FIG. 9 shows curves of illuminance measured along an X-axis on an area at 1.6 m of an optical path, of the present invention and a conventional fluorescent lamp.
Figure 10:
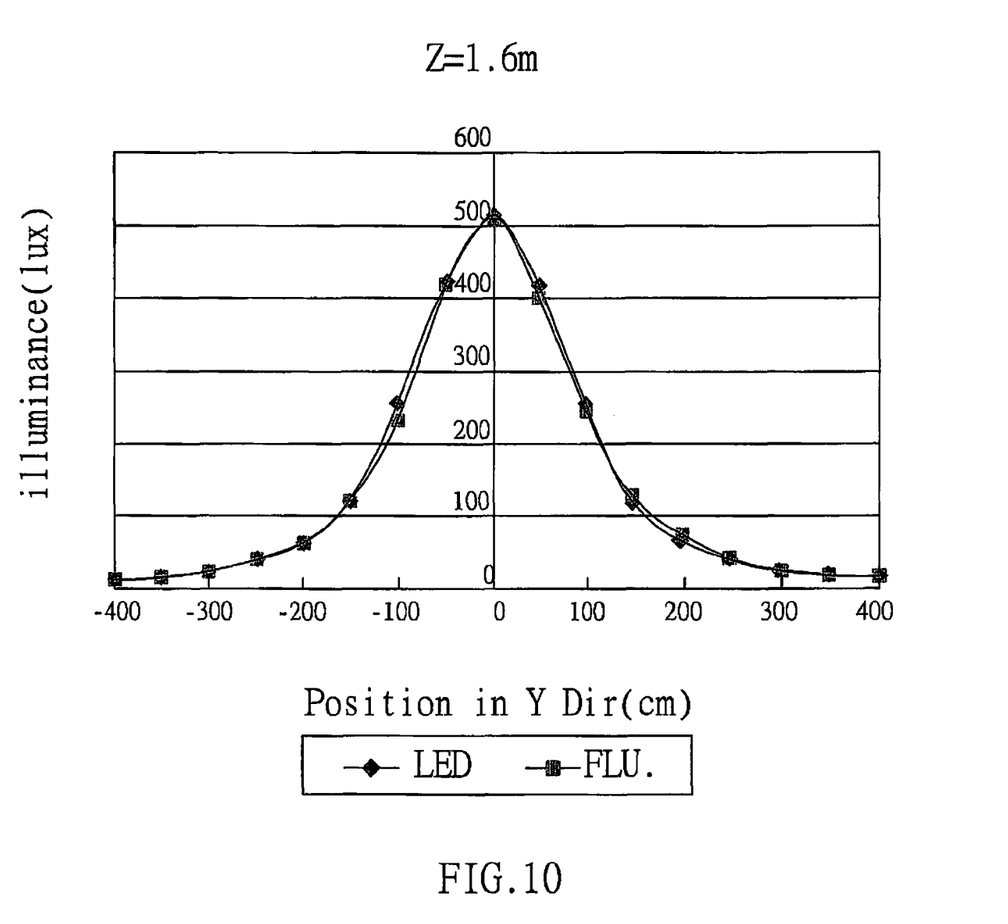
FIG. 10 shows curves of illuminance measured along a Y-axis on an area at 1.6 m of an optical path, of the present invention and a conventional fluorescent lamp.
Figure 11:
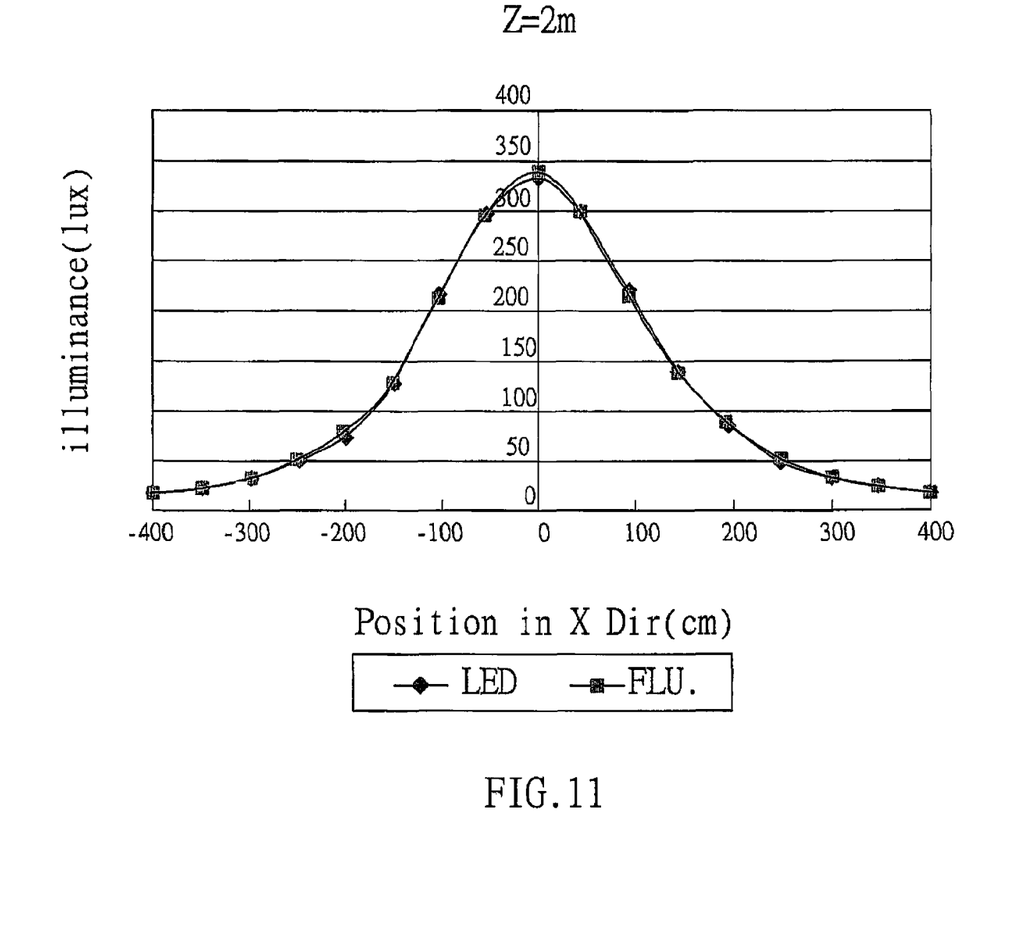
FIG. 11 shows curves of illuminance measured along an X-axis on an area at 2 m of an optical path, of the present invention and a conventional fluorescent lamp.
Figure 12:
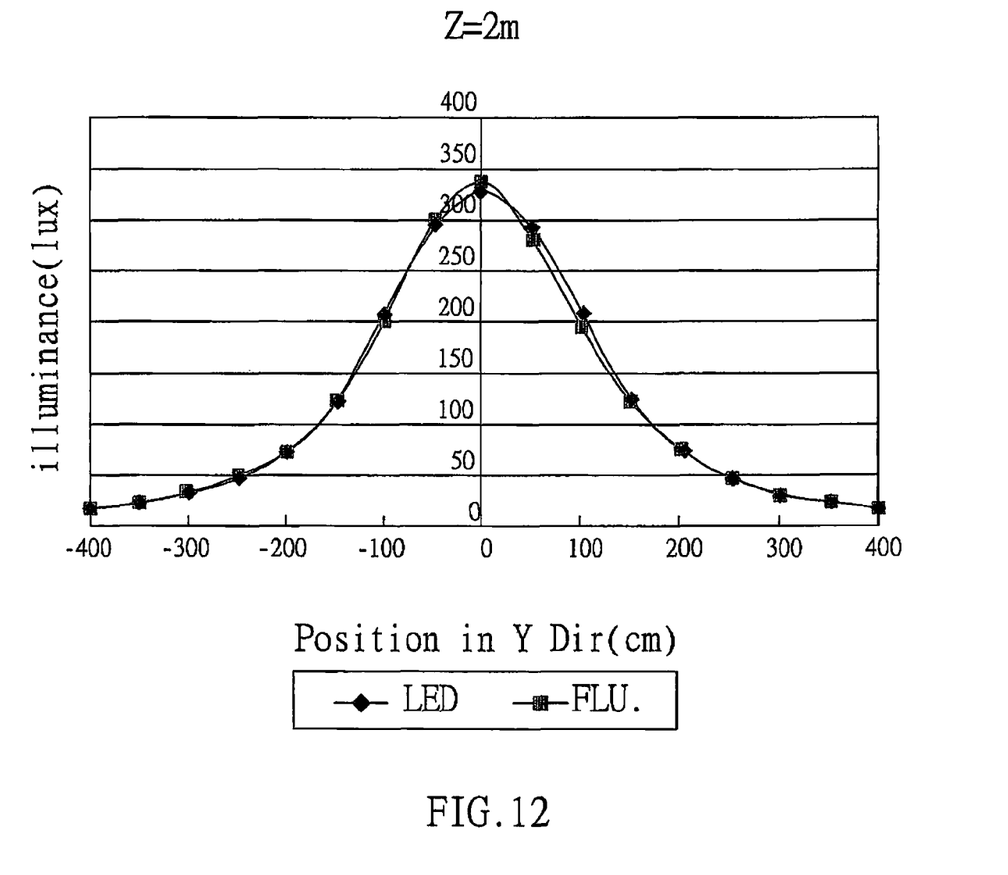
FIG. 12 shows curves of illuminance measured along a Y-axis on an area at 2 m of an optical path, of the present invention and a conventional fluorescent lamp.

Referring to FIG. 7 and FIG. 8, it shows curves of illuminance measured along an X-axis and a Y-axis of a projection area, as well as at projection distances of 1.6 m and 2 m, for an implementation of 48 LEDs of 1 W according to the aforementioned design, under a specification of system power of 110V (volt), 60 Hz (Hertz) and 75 W.

Referring to FIGS. 9 to 12, it shows curves of illuminance measured along an X-axis and a Y-axis of a projection area under projection distances of 1.6 m and 2 m, for comparing the illumination efficiencies of the present invention with a conventional fluorescent lamp.

For specifications of the two aforementioned lamp-sets that are implemented respectively, the ceiling lamp of the present invention operates at 75 W, the conventional fluorescent lamp operates at 90 W, and both operate at a working temperature of 55° C. (Celsius). By comparing the measurement results with the conventional fluorescent lamp, at the projection distance of 1.6 m and 2.0 m respectively, it is found that, within 0 to 1.5 m, the illuminance can satisfy the light flux for reading, and the illuminance is very close to that of the fluorescent lamp and even exceeds the fluorescent lamp at a different axis value. The aforementioned conditions are used for the comparison of the ceiling lamp of the present invention with the conventional fluorescent lamp.

The data obtained from the illuminance comparison along the X and Y axes on the projection surface are listed in Table 1 and Table 2.

TABLE 1

| Z = 1.6 m | | | | | |
|---|---|---|---|---|---|
| X (cm) | LED (lux) | Flu. (lux) | Y (cm) | LED (lux) | Flu. (lux) |
| 400 | 14 | 14 | 400 | 14 | 11 |
| 350 | 18 | 19 | 350 | 19 | 16 |

TABLE 1-continued

| Z = 1.6 m | | | | | |
|---|---|---|---|---|---|
| X (cm) | LED (lux) | Flu. (lux) | Y (cm) | LED (lux) | Flu. (lux) |
| 300 | 26 | 27 | 300 | 26 | 25 |
| 250 | 38 | 43 | 250 | 39 | 41 |
| 200 | 63 | 77 | 200 | 63 | 71 |
| 150 | 125 | 140 | 150 | 118 | 125 |
| 100 | 255 | 249 | 100 | 253 | 241 |
| 50 | 430 | 413 | 50 | 416 | 397 |
| 0 | 513 | 506 | 0 | 511 | 506 |
| −50 | 435 | 416 | −50 | 426 | 417 |
| −100 | 269 | 248 | −100 | 255 | 233 |
| −150 | 134 | 130 | −150 | 121 | 117 |
| −200 | 69 | 68 | −200 | 62 | 64 |
| −250 | 42 | 42 | −250 | 39 | 41 |
| −300 | 30 | 27 | −300 | 27 | 25 |
| −350 | 21 | 19 | −350 | 20 | 17 |
| −400 | 16 | 14 | −400 | 15 | 11 |

TABLE 2

| Z = 2 m | | | | | |
|---|---|---|---|---|---|
| X (cm) | LED (lux) | Flu. (lux) | Y (cm) | LED (lux) | Flu. (lux) |
| 400 | 17 | 16 | 400 | 16 | 14 |
| 350 | 22 | 22 | 350 | 21 | 20 |
| 300 | 31 | 32 | 300 | 29 | 31 |
| 250 | 47 | 50 | 250 | 44 | 47 |
| 200 | 77 | 81 | 200 | 72 | 73 |
| 150 | 132 | 130 | 150 | 121 | 122 |
| 100 | 214 | 208 | 100 | 207 | 195 |
| 50 | 296 | 296 | 50 | 292 | 281 |
| 0 | 330 | 340 | 0 | 329 | 339 |
| −50 | 295 | 294 | −50 | 293 | 302 |
| −100 | 215 | 209 | −100 | 209 | 200 |
| −150 | 125 | 127 | −150 | 124 | 118 |
| −200 | 72 | 77 | −200 | 72 | 68 |
| −250 | 46 | 50 | −250 | 44 | 47 |
| −300 | 31 | 33 | −300 | 30 | 32 |
| −350 | 22 | 22 | −350 | 22 | 21 |
| −400 | 17 | 16 | −400 | 16 | 14 |

Figure 13:
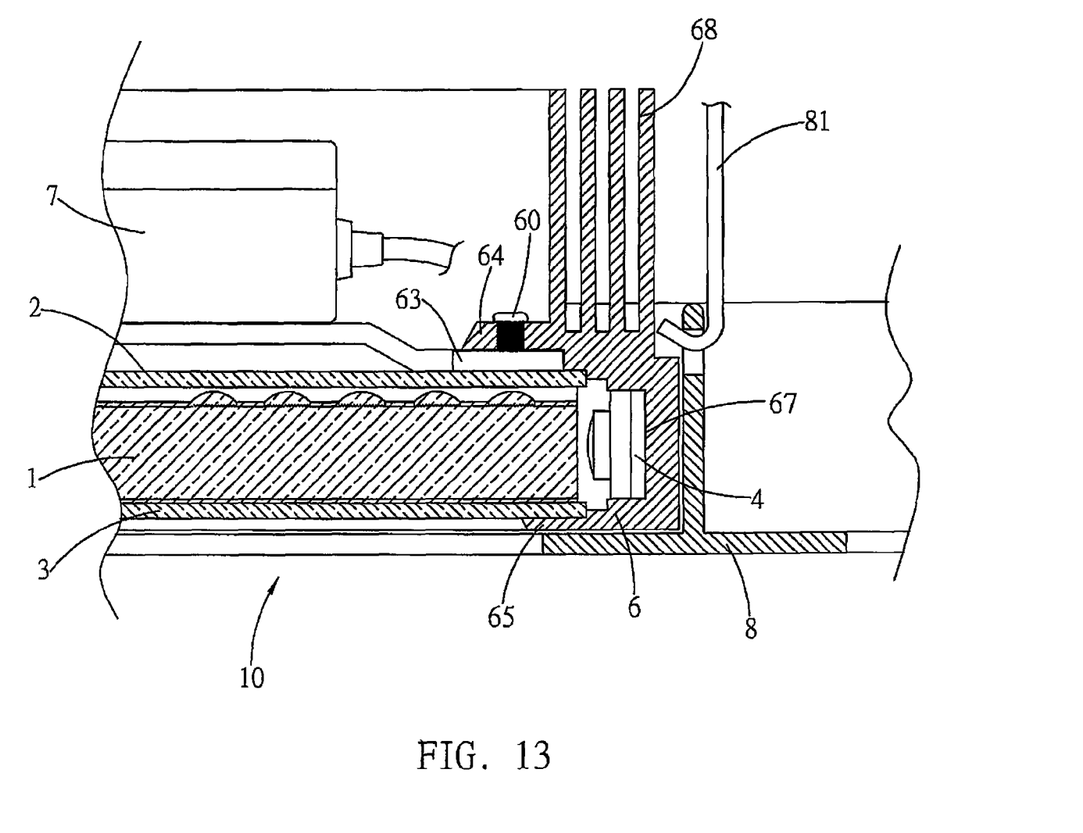
FIG. 13 shows a schematic view of frames of the present invention being directly implemented as a heat dissipation mechanism.

Referring to FIG. 13, as the side of the ceiling lamp 10 of the present invention is provided with the LED excitation unit 4, a structural position and an issue of thermal strain degradation resulted from waste heat generated by the excitation unit 4 should be taken into account. Therefore, a single-unit frame 6 is used, wherein an interior of the frame 6 is formed with a slot 67 for installing the excitation unit 4. The frame 6 is further provided with a fastening lip 64 and a support plate 65 between which the light guide plate 1, the reflection plate 2 and the light diffuser plate 3 are clamped. In addition, the assembly element 60 can be used for locking, and there are four frames 6 at four sides of the light guide plate 1, with the frames 6 being assembled with the light guide plate 1 by any corner joint method. On the other hand, the assembly element 60 can assemble and fix with the light guide plate 1, the reflection plate 2 and the light diffuser plate 3, wherein a pad 63 can be provided between the assembly element 60 and the reflection plate 2 for buffering, such that the assembly element 60 will not directly press on the reflection plate 2 or the light guide plate 1.

An upper end of the frame 6 is extended with a cooling fin 68, wherein the cooling fin 68 is set at an upward position to prevent from occupying a horizontal space of the light-weight steel frame 8. If the horizontal space is sufficient, then the cooling fin 68 can be set as a horizontal shape. To not affect appearance of the light-weight steel frame 8, the cooling fin 68 can be even set as downward to contact indoor air, so as to acquire a better heat exchange rate.

The frame 6 can be made by a metallic material of higher thermal conductivity, such as aluminum alloy. Thermal conductive adhesive can be provided between the slot 67 and the excitation unit 4 for fixing and obtaining a fast directed heat transfer effect.

The light-weight steel frame 8 is hooked on an indoor roof with hooks 81, forming a space in a length of the hook 81. That space can satisfy the emplacement of the cooling fin 68 and the requirement of the cooling space.

The cooling fin 68 which is extended upward above the frame 6 is provided with a height, and a concaved hole is formed above an interior of the ceiling lamp 10. The concaved hole can provide for the emplacement of the power supply 7. The electricity provided by the power supply 7 is connected to the LED excitation unit 4 through a circuit, providing a source of operation to the excitation unit 4. The power supply 7 can be locked by the assembly element 60 at a same time, and can be assembled at the pad 63 through a slab connection method. Therefore, at a same time when locking the assembly element 60, the installation position of the power supply 7 can be fixed as well.

Figure 14:
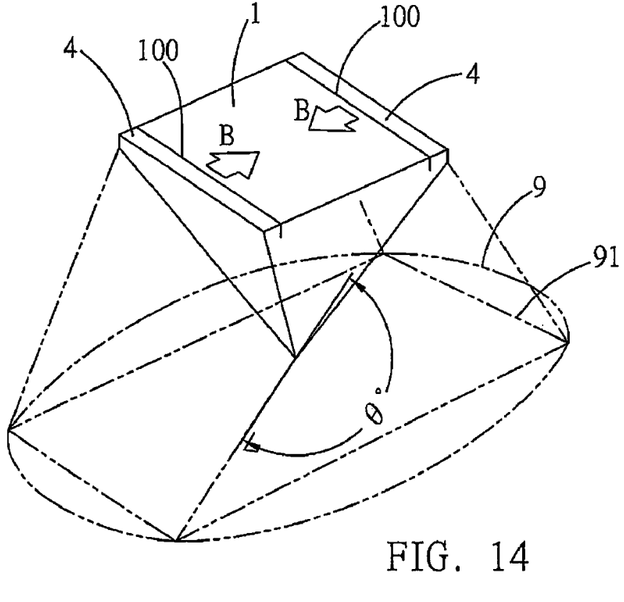
FIG. 14 shows a schematic view of the present invention, wherein excitation units are implemented on two opposite sides to form projection areas.
Figure 15:
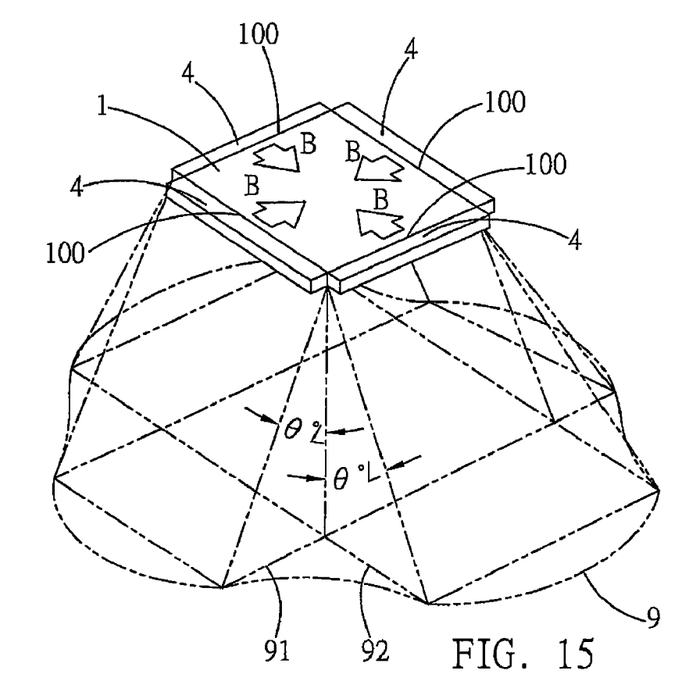
FIG. 15 shows a schematic view of the present invention, wherein excitation units are implemented on multiple opposite sides to form projection areas.

Referring to FIG. 14 and FIG. 15, the light beams is guided by the LED excitation unit 4 into the entrance surface 100 on the side of the light guide plate 1, followed by filling, traveling and being transformed in the light guide plate 1. One entrance surface 100 is parallel and symmetric to the opposite entrance surface 100. Therefore, the excitation unit 4 is also symmetric (as shown in FIG. 2), and the entrance surface 100 of the light guide plate 1 should be at least parallel at two sides or there can be as many as four entrance surfaces 100 at four sides of the light guide plate 1, with the corresponding excitation units 4. Basically, for the implementation of the present invention, the entrance surfaces 100 are set as parallel and symmetric that the requirement of illumination on the projection area can be satisfied.

Two sets of opposite LED excitation units 4 are implemented on two opposite sides of the light guide plate 1; hence, the two light beams B generated are emitted toward each other in a straight line. When the light guide plate 1 is in a rectangular shape and the illumination angle is defined at θ, the illumination beams that are projected will basically form a rectangular frame 91 and a projection area 9 will be driven by the rectangular frame 91 to form an elliptical shape, after being added by the scattering effect.

To obtain a more uniform edge shape for the projection area 9, each side of the light guide plate 1 is implemented with the entrance surface 100 (as shown in FIG. 15), and the multiple light beams B, which emit toward one another, are formed after assembling the corresponding LED excitation units 4. In addition, according to the defined illumination angle θ, two interleaved rectangular frames 91, 92 are formed, resulting in the projection area 9 which is closer to a circle, after being added by the scattering effect.

The arrangement of the entrance surface 100 depends upon a number of symmetric sides of the light guide plate 1. If the light guide plate 1 is a symmetric polygon, then each side is implemented with the entrance surface 100 and the LED excitation unit 4, and the projection area 9 will be even closer to a circle.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A refraction-type LED (Light Emitting Diode) ceiling lamp, especially a plate-type ceiling lamp used on an indoor ceiling with a limited projection angle to project brilliance on a limited area on a ground, comprising a fiber light guide plate roughly in a symmetric polygonal shape, a side of which is a reflection surface and the other side of which is a refraction surface, the reflection surface being further provided with reflection elements, at least two opposite sides of the light guide plate being provided respectively with an entrance surface; a frame, which is provided with plural LED exciting elements arranged in a series, encloses the light guide plate at positions opposite to exterior sides of the entrance surfaces and is capable of conducting heat to expel out waste heat of the LED exciting elements; a light diffuser plate which is assembled at the refraction surface of the light guide plate; a reflection plate which is assembled at the reflection surface of the light guide plate; plural reflection elements, which are assembled at the reflection surface of the light guide plate and are spherical bodies protruded outward, with inner spheres forming inner reflection curves, a chip size decreasing gradually from a breadth center of the light guide plate toward the entrance surface, and a gap between neighboring reflection elements increasing gradually from the breadth center of the light guide plate toward the entrance surface; and an electronic drive circuit which provides working electricity required by the LED exciting elements.

2. The refraction-type LED ceiling lamp according to claim 1, wherein the chip size of the reflection element decreases outward gradually by a geometric series, from a breadth center of the reflection surface.

3. The refraction-type LED ceiling lamp according to claim 1, wherein a gap between the neighboring reflection elements increases outward gradually by a geometric series, from the breadth center of the reflection surface.

4. The refraction-type LED ceiling lamp according to claim 1, wherein the chip size of the reflection elements at the breadth center of the light guide plate is two times larger than the chip size of the reflection elements at the outermost of the light guide plate, close to the entrance surface.

5. The refraction-type LED ceiling lamp according to claim 1, wherein the gap between the neighboring reflection elements at the breadth center is two times smaller than the gap between the neighboring reflection elements at the outermost of the light guide plate, close to the entrance surface.

6. The refraction-type LED ceiling lamp according to claim 1, wherein the reflection elements are integrally formed with the light guide plate.

7. The refraction-type LED ceiling lamp according to claim 1, wherein the reflection elements are made by an optic ink printing method.

8. The refraction-type LED ceiling lamp according to claim 1, wherein the frame is assembled and fixed through an assembly element, with an upper frame and a lower frame.

9. The refraction-type LED ceiling lamp according to claim 1, wherein the entrance surface is provided at each side of the light guide plate.

10. The refraction-type LED ceiling lamp according to claim 1, wherein the frame is integrally formed and is provided with a slot for installing the LED exciting element, with a side of the frame being extended with a cooling fin, and an interior of the frame being formed with a fastening lip and a support plate to clamp the light guide plate.

* * * * *